US010950231B1

(12) United States Patent
Kockerbeck et al.

(10) Patent No.: US 10,950,231 B1
(45) Date of Patent: Mar. 16, 2021

(54) SKILL ENABLEMENT

(71) Applicant: Amazon Technologies, Inc., Seattle, WA (US)

(72) Inventors: Mark Conrad Kockerbeck, Seattle, WA (US); John Peach, Seattle, WA (US); Kevin Boehm, Seattle, WA (US); Tina Orooji, Seattle, WA (US); Ian Christopher Suttle, Seattle, WA (US); Robert Pulciani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 16/121,283

(22) Filed: Sep. 4, 2018

(51) Int. Cl.
*G10L 15/22* (2006.01)
*G10L 15/18* (2013.01)
*G10L 15/26* (2006.01)

(52) U.S. Cl.
CPC .............. *G10L 15/22* (2013.01); *G10L 15/18* (2013.01); *G10L 15/26* (2013.01); *G10L 2015/223* (2013.01)

(58) Field of Classification Search
CPC ......... G10L 15/22; G10L 15/26; G10L 15/18; G10L 2015/223
USPC ....................................................... 704/235
See application file for complete search history.

(56) References Cited

U.S. PATENT DOCUMENTS

| 8,489,872 | B1* | 7/2013 | Kapoor | G06F 16/258 713/100 |
| 8,812,482 | B1* | 8/2014 | Kapoor | G06F 16/273 707/713 |
| 9,043,355 | B1* | 5/2015 | Kapoor | G06F 8/63 707/769 |
| 9,053,146 | B1* | 6/2015 | Kapoor | G06F 16/2308 |
| 9,063,978 | B1* | 6/2015 | Kapoor | G06F 8/20 |
| 9,098,509 | B1* | 8/2015 | Kapoor | G06F 9/451 |
| 9,363,272 | B2* | 6/2016 | McBride | H04W 12/0605 |
| 9,396,232 | B1* | 7/2016 | Kapoor | G06Q 10/1091 |
| 9,405,799 | B1* | 8/2016 | Kapoor | G06Q 10/1053 |
| 9,405,800 | B1* | 8/2016 | Kapoor | G06Q 20/10 |
| 9,454,526 | B1* | 9/2016 | Kapoor | G06F 16/24564 |
| 9,454,576 | B1* | 9/2016 | Kapoor | G06F 16/24564 |
| 9,454,577 | B1* | 9/2016 | Kapoor | G06Q 30/04 |
| 9,659,062 | B1* | 5/2017 | Kapoor | G06F 16/24564 |
| 9,672,281 | B1* | 6/2017 | Kapoor | G06F 16/258 |
| 10,180,962 | B1* | 1/2019 | Kapoor | H04M 15/8228 |
| 10,332,513 | B1* | 6/2019 | D'Souza | G10L 15/197 |
| 10,623,246 | B1* | 4/2020 | Iyer | G10L 15/22 |

(Continued)

*Primary Examiner* — Edwin S Leland, III

(74) *Attorney, Agent, or Firm* — Pierce Atwood LLP

(57) ABSTRACT

Techniques for selecting a skill, to respond to a user input, using skill rankings are described. A skill's ranking may be determined in different manners. In one example, a skill's ranking may be determined based on a number of different users inputting commands that invoke the skill over a period of time. In another example, a skill's ranking may be determined based on a number of different devices that capture user inputs that invoke the skill over a period of time. A system may determine whether to automatically enable a skill (e.g., without user input received after the original user input), or ask the user whether the skill should be enabled, based on the skill's ranking. Moreover, a system may use a skill's ranking to determine whether to interact with a user, to enable the skill, using a graphical user interface or a voice user interface.

20 Claims, 9 Drawing Sheets

(56) References Cited

U.S. PATENT DOCUMENTS

| | | | |
|---|---|---|---|
| 10,720,157 B1* | 7/2020 | Kapila | G10L 13/043 |
| 10,733,222 B1* | 8/2020 | Miller | G06F 3/167 |
| 2009/0103785 A1* | 4/2009 | Pedroza | G07C 9/37 |
| | | | 382/117 |
| 2010/0197318 A1* | 8/2010 | Petersen | H04L 67/22 |
| | | | 455/456.1 |
| 2012/0066231 A1* | 3/2012 | Petersen | G06Q 30/02 |
| | | | 707/748 |
| 2014/0143149 A1* | 5/2014 | Aissi | G06F 21/316 |
| | | | 705/44 |
| 2014/0164597 A1* | 6/2014 | Dahan | G10L 15/22 |
| | | | 709/224 |
| 2014/0373101 A1* | 12/2014 | Mani | H04L 9/3213 |
| | | | 726/4 |
| 2018/0199123 A1* | 7/2018 | Rao | G06F 1/203 |
| 2019/0005953 A1* | 1/2019 | Bundalo | G06F 1/3287 |
| 2019/0075458 A1* | 3/2019 | Kulakowski | H04L 63/18 |
| 2019/0081949 A1* | 3/2019 | Wu | H04L 67/22 |
| 2019/0371329 A1* | 12/2019 | D'Souza | G10L 15/063 |

\* cited by examiner

FIG. 2

| Skill Category | Skill GUI Discoverability and Enablement | Skill VUI Discoverability | Skill VUI Enablement |
|---|---|---|---|
| 0 | No | No | No |
| 1 | Yes | No | No |
| 2 | Yes | Limited | Limited |
| 3 | Yes | Yes | No |
| 4 | Yes | Yes | Yes (with further user permission) |
| 5 | Yes | Yes | Yes |

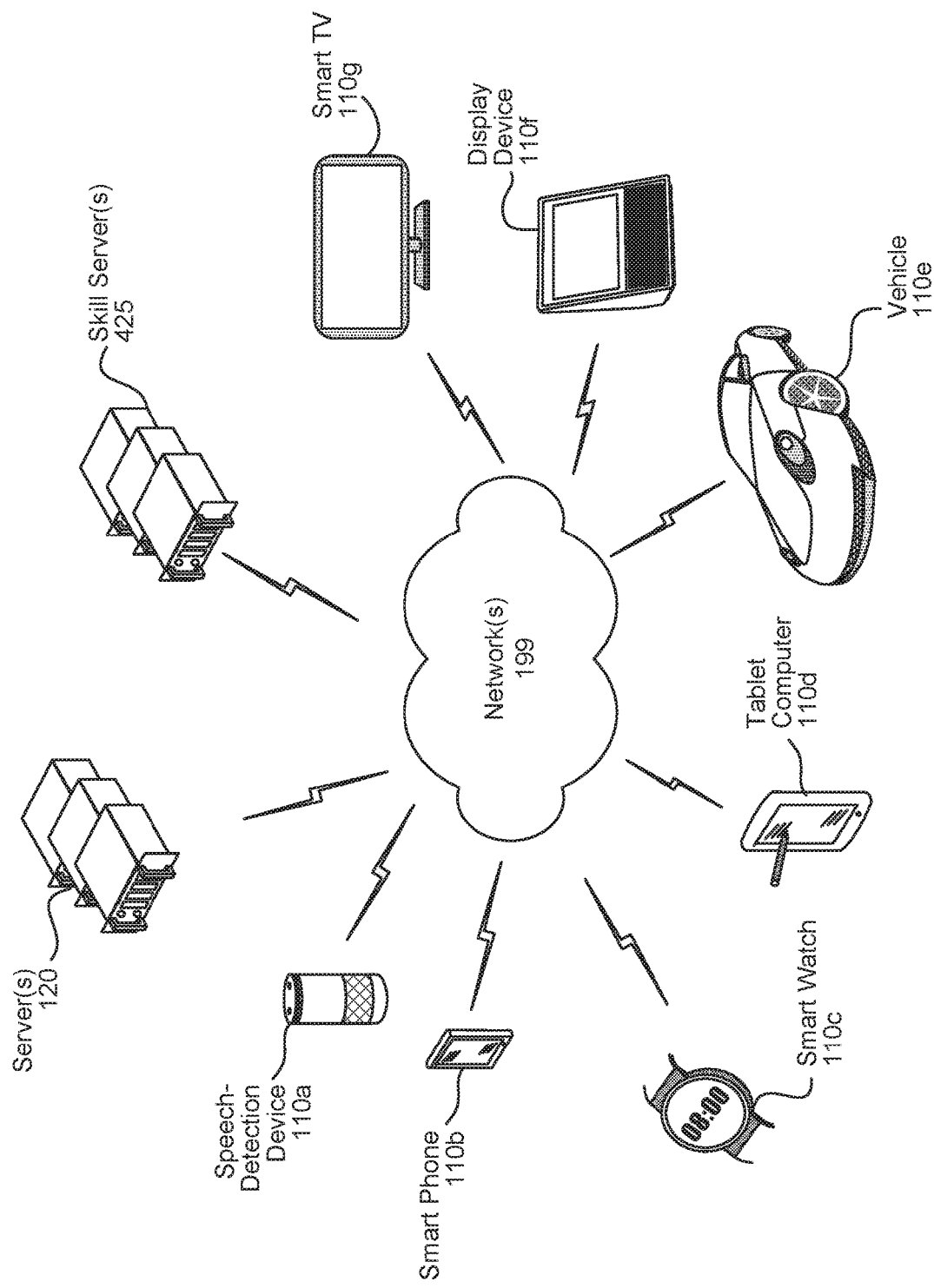

SKILL ENABLEMENT

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to skills.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram illustrating skill categorizations, discoverability, and enablement processes according to embodiments of the present disclosure.

FIG. 9 illustrates an example of a computer network for use with the speech processing system.

DETAILED DESCRIPTION

Figure 1:
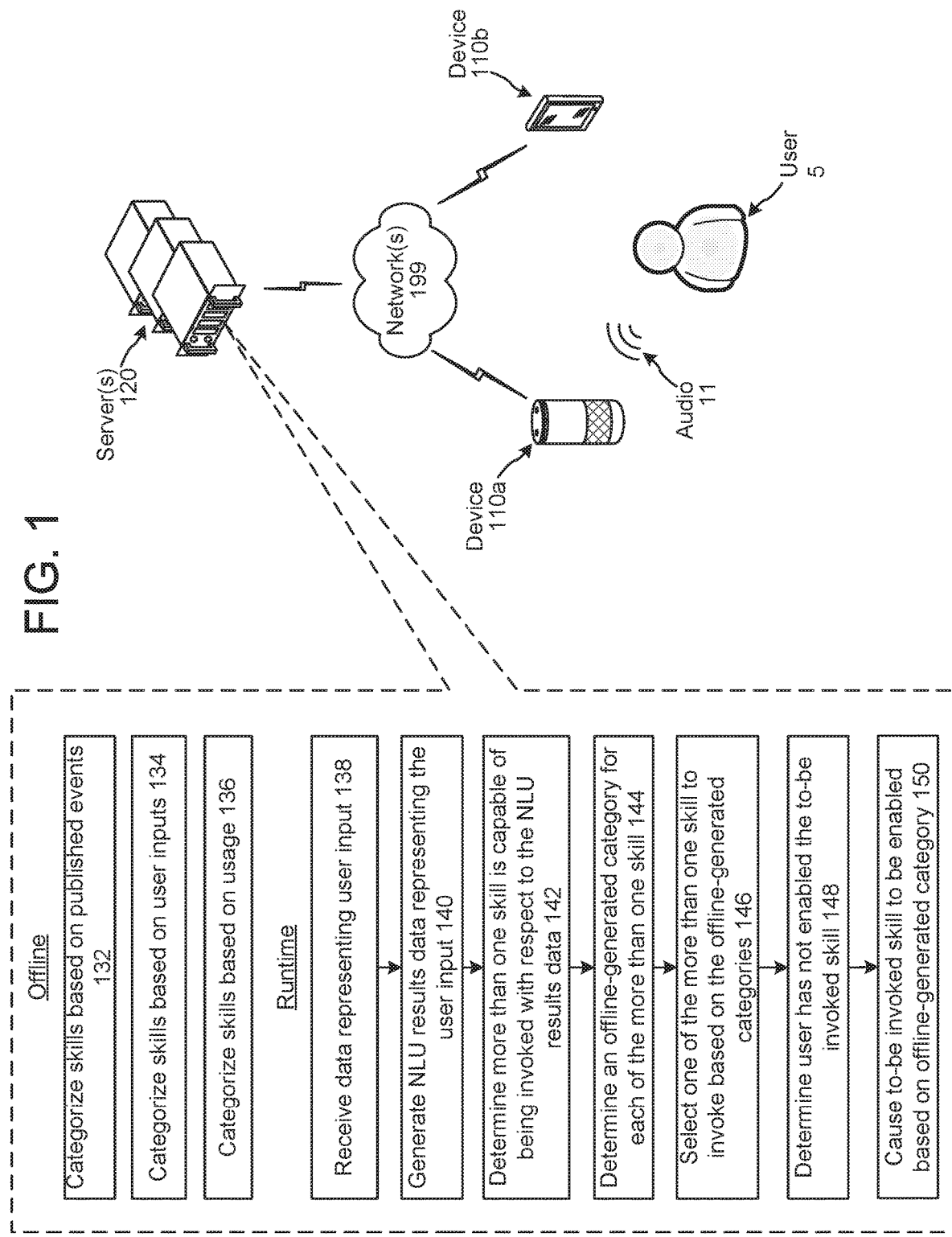
FIG. 1 illustrates a system configured to select an enablement process for a skill according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with the generation of synthesized speech. ASR, NLU, and TTS may be used together as part of a system.

Certain systems may be configured to perform actions in response to user inputs. For example, for the user input of "Alexa, play Adele music," a system may output music sung by Adele. For further example, for the user input of "Alexa, what is the weather," a system may output synthesized speech representing weather information for a geographic location of the user. In another example, for the user input of "Alexa, make me a dinner reservation," a system may book a dinner reservation with the user's favorite restaurant.

A system may be configured with various skills. A "skill" may be software running on one or more servers that is akin to a software application running on a traditional computing device.

Skills of a system may output similar content or perform similar actions. Thus, different skills of the system may be invoked to respond to the same user input. For example, a system may include multiple skills that are capable of provide content responsive to the user input of "Alexa, tell me a cat fact."

A user may provide a system with permission to enable skills in response to user inputs. Such may be referred to as automatic enablement, automated enablement, or the like.

A system may select which skill, of various possible skills, to actually invoke to respond to a user input. In some instances, if the selected skill is not enabled by the user, the system may enable the skill with respect to the user upon the system choosing to invoke the skill.

The present disclosure improves the aforementioned systems using skill categorizations. A skill's category may be determined in different manners. In one example, a skill's category may be determined based on a number of different users inputting commands that invoke the skill over a period of time. In another example, a skill's category may be determined based on a number of different devices that capture user inputs that invoke the skill over a period of time.

The system may determine whether to automatically enable a skill (e.g., with respect to a user profile without an explicit command from a user to do so), or ask the user whether the skill should be enabled, based on the skill's category. For example, if an incoming utterance may potentially invoke an as-of-yet un-enabled skill, the system may automatically enable the skill without first asking the user if the skill corresponds to a particularly high category.

The teachings of the present disclosure permit skills that are potentially relevant to a user to be automatically enabled for the user by a system while also decreasing a likelihood that a skill that is not relevant to the user will be automatically enabled for the user. For example, a system may be configured with two skills capable of outputting the same type of content. (For example, two skills capable of returning cat facts.) One of the skills may include content that is deemed trusted by a system while the other skill's content may not be trusted. As a result, if the system receives a user input that may be responded to using either of the skills, the system may invoke the trusted skill, and automatically enable the trusted skill with respect to the user that provided the user input. Thus, the teachings of the present disclosure may increase a probability that a system will invoke and enable a reliable skill.

The teachings of the present disclosure also limit the possibility of a fraudulent skill from being automatically enabled. A fraudulent skill may refer to a skill that seeks to engage a user in malicious activities. An example of a fraudulent skill may be a non-banking skill that attempts to obtain a user personal identification number (PIN) for the purpose of accessing one or more banking accounts.

A fraudulent skill may include an invocation name that is phonetically similar to a non-fraudulent skill. For example, a non-fraudulent skill's invocation name may be "Bank One" and a fraudulent skill's invocation name may be "Banke One." If the user speaks an input corresponding to "tell me my account balance for Bank One," a system not implementing the present disclosure may potentially choose to invoke the "Banke One" skill even though the user intended to invoke the "Bank One" skill. The teachings of the present disclosure limit, or negate, this scenario's occurrence. In addition, ASR processing may transcribe speech incorrectly and a developer may intentionally set their skill's invocation name to the incorrect transcription.

FIG. 1 illustrates a system configured to select an enablement process for a skill. Although the figures and discussion of the present disclosure illustrate certain operational steps of the system in a particular order, the steps described may be performed in a different order (as well as certain steps removed or added) without departing from the intent of the disclosure. Devices (110*a*/110*b*) local to a user 5 may communicate with one or more servers 120 across one or more networks 199.

During offline operations, the server(s) 120 may categorize (132) skills based on published events. When a skill is invoked to respond to a user input, the skill publishes events to the server(s) 120. The published events may represent how long the skill is instructing a user device to capture audio (in efforts to capture further user input), the type of content being output by the skill (e.g., whether the skill's output includes profanity), the type of content the skill is requesting from a user (e.g., sensitive banking information), etc.

The server(s) 120 may categorize a skill based on its published events. For example, the server(s) 120 may categorize a non-banking skill relatively low if the non-banking skill is requesting banking specific information from a user. For further example, the server(s) 120 may decrease a skill's category if the skill is instructing a device 110 to capture audio for an unjustifiably long period of time (e.g., indicating the skill is attempting to eavesdrop on a user). Other types of published events and corresponding effects on skill categories are also possible.

The server(s) 120 may also or alternatively categorize (134) skills based on user inputs. The system may be configured to enable a user to provide an input regarding whether (and to what extent) the user trusts (or does not trust) a skill. Such input may be received in the form of speech, a text input, the selection of a virtual button presented on the display of a device 110, etc. Moreover, such an input may be received via a companion application implemented by a device 110. A companion application enables a device 110 to communicate (e.g., send data to and receive data from) the server(s) 120. An example of a companion application is the Amazon Alexa application that may be installed on a smart phone, tablet, and the like. If a user provides an input that the user trusts a skill, the server(s) 120 may increase the skill's category. Conversely, if a user provides an input that the user does not trust a skill, the server(s) 120 may decrease the skill's category.

The server(s) 120 may also or alternatively categorize (136) skills based on usage. The system may receive various user inputs that, over a period of time, result in the invocation of a particular skill. The server(s) 120 may determine a number of different users (e.g., a number of different user profile identifiers) associated with the user inputs (e.g., a user that originated more than one of the user inputs may only be counted once), and may determine whether that number of different users satisfies a condition (e.g., a threshold number of different users or user profile identifiers). If the number of different users satisfies the condition, the server(s) 120 may increase the skill's category. Conversely, if the number of different users fails to satisfy the condition, the server(s) 120 may decrease the skill's category.

Each of the user inputs, which are received over the period of time and that result in the invocation of a skill, may be associated with a respective device or device identifier (e.g., representing the device 110 that captured the user input). The server(s) 120 may determine whether a number of different devices (e.g., a number of different device identifiers) associated with the user inputs (e.g., a device associated with more than one of the user inputs may only be counted once), and may determine that the number of different devices satisfies a condition (e.g., a threshold number of different devices or device identifiers). If the number of different devices satisfies the condition, the server(s) 120 may increase the skill's category. Conversely, if the number of different devices fails to satisfy the condition, the server(s) 120 may decrease the skill's category.

FIG. 2 illustrates various skill categories with associated discoverabilities and enablement processes. While categories of 0 to 5 are illustrated, other categories may be implemented by the system. As illustrated, a skill categorized as 0 may not be discovered or enabled via either a graphical user interface (GUI) or a voice user interface (VUI). A skill categorized as 1 may be discovered and enabled via a GUI, but may not be discovered or enabled via a VUI. A skill categorized as 2 may be discovered and enabled via a GUI, but may only be discovered and/or enabled via a VUI in certain scenarios. A skill categorized as 3 may be discovered and enabled via a GUI, and discovered via a VUI, but not enabled via a VUI. A skill categorized as 4 may be discovered via a GUI or VUI, and may be enabled via a VUI with further user permission (e.g., different from a general permission, received from a user, to enable skills for the user). A skill categorized as 5 may be discovered and enabled via a GUI and/or VUI.

As used herein, a "trusted" skill refers to a skill corresponding to a category that satisfies a condition (e.g., that satisfies a threshold category). A trusted skill may become "whitelisted." Moreover, as used herein, an "untrusted" skill refers to a skill corresponding to a category that does not satisfy a condition (e.g., does not satisfy a threshold category). An untrusted skill may become "blacklisted" (e.g., users are not permitted to invoke the skill).

Referring back to FIG. 1, sometime after the server(s) 120 categorizes the skills, a user 5 may provide a user input to a device (110*a*/110*b*). For example, the device 110*a* may capture audio 11 representing a spoken user input, and may generate audio data representing the captured audio 11. For further example, the device 110*b* may detect touch inputs corresponding to a text-based input, and may generate text data representing the text-based input. The device (110*a*/110*b*) may send data representing the user input (e.g., the audio data or the text data) to the server(s) 120, which the server(s) 120 receives (138). In an example, the device 110 may send the data, representing the user input, to the server(s) 120 via a companion application installed on the device 110.

The server(s) 120 generates (140) NLU results data representing the user input. If the user input is received as audio data, the server(s) 120 may perform ASR processing on the audio data to generate text data, and may perform NLU processing on the generated text data to generate the NLU results data. If the user input is received as text data, the server(s) 120 may perform NLU processing on the received text data to generate the NLU results data.

The server(s) 120 determines (142) more than one skill is capable of being invoked with respect to the NLU results data. The server(s) 120 may perform a database search, of a database including skill names, to identify one or more skills configured to be invoked with respect to the NLU results data.

The database search may return a list of skill names. Each skill name may be associated with a confidence value representing a likelihood that the respective skill should be invoked with respect to the NLU results data. Such confidence value may be represented as a numeric value (e.g., on a scale of 0-10, 0-100, 0-1000, or some other scale) or as a binned value (e.g., high, medium, or low).

If the server(s) 120 determines only one of the skill names is associated with a confidence value satisfying a condition (e.g., satisfying a threshold confidence value), the server(s) 120 may invoke the skill, associated with the skill name, to execute with respect to the NLU results data. If the server(s) 120 determines none of the skill names are associated with confidence values that satisfying the condition, or if multiple skill names are associated with confidence values satisfying the condition, the server(s) 120 may identify (144) an offline-generated category for each skill (e.g., such as the categories illustrated in FIG. 2).

The server(s) 120 selects (146) a skill to invoke based on the offline-generated categories. The server(s) 120 may choose to invoke a first skill having a lower confidence value than a second skill if the skills' confidence values are within a threshold deviation of each other and if the first skill's category is higher than the second skill's category.

The server(s) 120 may ignore one or more of the skills corresponding to categories that do not satisfy a condition (e.g., that do not meet or exceed a threshold category). The server(s) 120 may also or alternatively ignore one or more of the skills based on the type of user input that was received. As illustrated in FIG. 2, skills of certain categories may not be discoverable using either a GUI or a VUI, may only be discoverable using a GUI, or may be discoverable using either a GUI or a VUI. Thus, for example, skills that may only be discovered using a GUI may be ignored if the user input was spoken by the user 5.

The server(s) 120 may determine (148) the user 5 has not enabled the to-be invoked skill. For example, the server(s) 120 may determine a user identifier associated with the user input (e.g., by comparing speech characteristics of a spoken user input to stored speech characteristics of users), determine user profile data associated with the user identifier, and determine the user profile data does not indicate the skill has been enabled.

The server(s) 120 may thereafter cause (150) the to-be invoked skill to be enabled based on the skill's offline-generated category (e.g., as described with respect to steps 132-136). As illustrated in FIG. 2, different categories of skills may be associated with different types of enablement processes. Thus, for example, if the to-be invoked skill is associated with a category that requires GUI enablement processes, the system may engage the user 5 in GUI interactions to enable the to-be invoked skill. For further example, if the to-be invoked skill is associated with a category that permits either GUI or VUI enablement processes, the system may engage the user 5 in GUI and/or VUI interactions to enable the to-be invoked skill. In such a situation, the server(s) 120 may determine whether to engage the user 5 in GUI and/or VUI based interactions based on various considerations, including but not limited to the type (e.g., spoken or text) of user input that was originally received at step 138.

Figure 3:
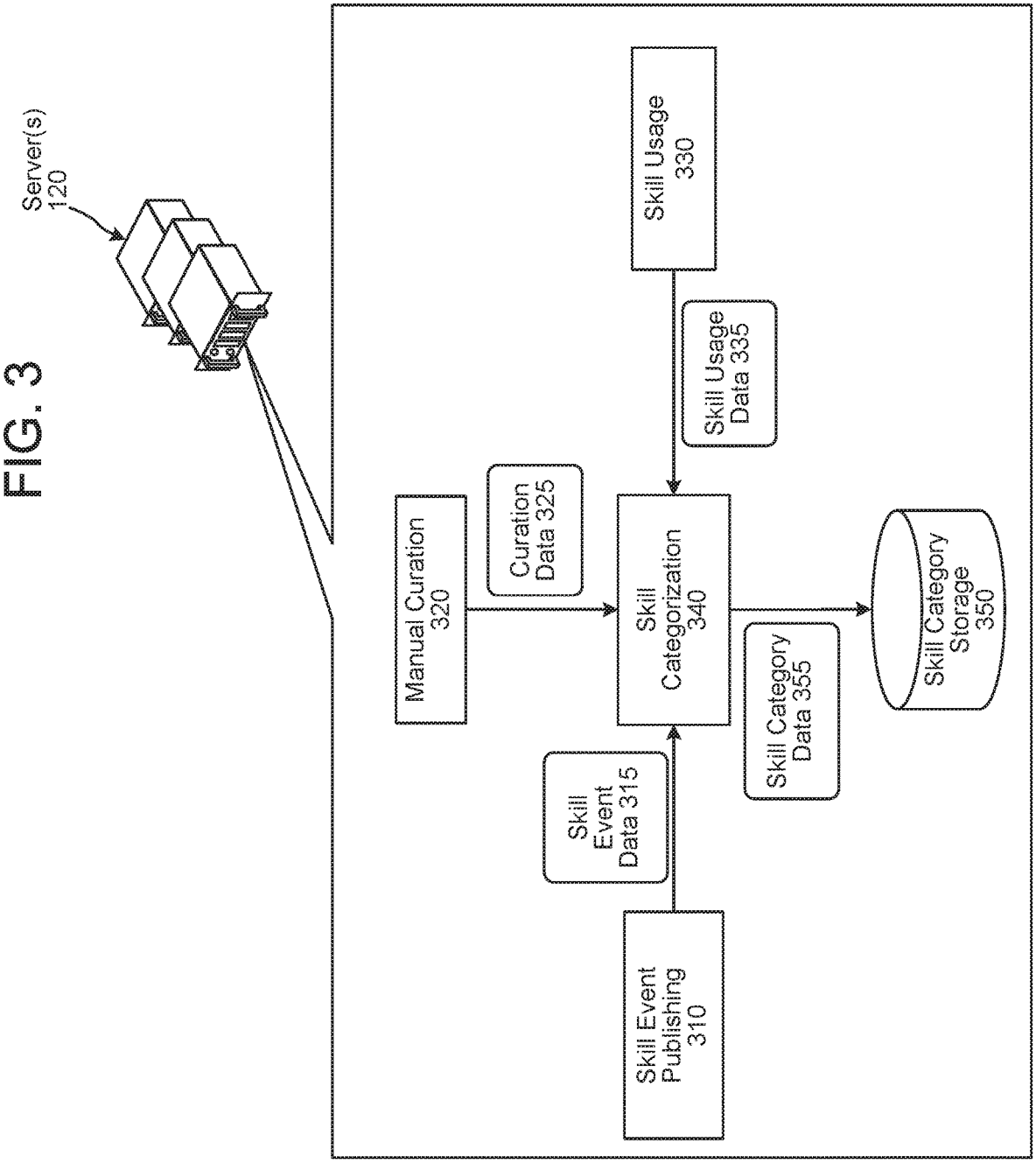
FIG. 3 is a conceptual diagram of components for determining skill categorizations during offline operations according to embodiments of the present disclosure.

The system may include various components for determining skill categories during offline operations, as illustrated in FIG. 3. The system may be defaulted to categorize a skill as untrusted until data indicates the skill should be trusted. A skill may be categorized as trusted if the skill's developer is recognized by the system (e.g., if the skill's developer has a formal relationship with an entity that oversees the server(s) 120). A new skill of a developer may be categorized as trusted if the skill developer is already associated with a trusted skill. For example, the system may maintain a log of trusted skills and their associated developers. When a new skill is on boarded to the system, the system may cross-reference the new skill's developer against the developers listed in the log. If the new skill's developer is represented in the log, the new skill may be categorized as trusted. A skill may initially be categorized when the skill is certified with the system.

Each category (as illustrated in FIG. 2) may correspond to a different trust level. Thus, the one or more skills associated with a given category may be trusted similarly by the system. The categories illustrated in FIG. 2 may be considered a whitelist categories that are used to discover and enable skills.

Some skills may transfer from the default untrusted category to a trusted category quicker than other skills. Moreover, some skills may always remain at the default untrusted category. In addition, some skills may transfer from a trusted category to an untrusted category.

The server(s) 120 may include a skill event publishing component 310, a manual curation component 320, a skill usage component 330, a skill categorization component 340, and skill category storage 350.

The skill event publishing component 310 is configured to monitor events published by various skills of the system. For example, the skill event publishing component 310 may monitor how long a skill is instructing a user device to capture audio, the type of content being output by a skill, the type of content a skill is requesting from the user, as well as other types of events. The skill event publishing component 310 may generate and output skill event data 315 representing various events monitored by the skill event publishing component 310. The skill event data 315 may include event information associated with different skills. As such, each event represented in the skill event data 315 may be associated with a skill identifier of the skill that published the event.

The manual curation component 320 is configured to receive user inputs indicating when users trust (or not trust) skills. Such inputs may be received in the form of speech, text input, the selection of virtual buttons presented on displays of devices 110, etc. Moreover, such inputs may be received via companion applications implemented by devices 110. The manual curation component 320 may generate and output curation data 325 representing one or more skill identifiers associated with one or more skills that have been indicated as trusted (or not trusted) by one or more users of the system.

The skill usage component 330 is configured to determine usages of skills by various users of the system. The skill usage component 330 may receive data representing various user inputs received by the system. Each user input may be associated with a time when the user input was received by the system, and a skill identifier of the skill that was invoked with respect to the user input. Each user input may also be associated with a user profile identifier (associated with the user that provided the user input) and/or a device identifier (associated with the device 110 that captured the user input). The skill usage component 330 may generate and output skill usage data 335 representing the foregoing information.

The skill categorization component 340 ranks skills based on received skill event data 315, curation data 325, skill usage data 335, and/or other data (e.g., whether a skill asks for a personal identification number, whether the skill's content changes rapidly, etc.). With respect to skill event data 315, the skill categorization component 340 may decrease a skill's category if the skill event data 315 represents the skill is instructing a device 110 to capture audio for an unjustifiably long period of time (e.g., indicating the skill is attempting to eavesdrop on a user). For further example, the skill categorization component 340 may decrease a skill's category if the skill event data 315 represents the skill is requesting information the skill should not be requesting (e.g., a non-banking skill is requesting banking specific information). The skill categorization component 340 may also or alternatively categorize skills based on other types of published events, in the skill event data 315, not explicitly detailed above.

With respect to the curation data 325, the skill categorization component 340 may increase a skill's category if the curation data 325 represents a user trusts the skill. In at least some instances, the skill categorization component 340 may increase a skill's category (based solely on the curation data 325) only if at least a threshold number of users have indicated they trust the skill. For further example, the skill categorization component 340 may decrease a skill's category if the curation data 325 represents a user does not trust the skill. In at least some instances, the skill categorization component 340 may decrease a skill's category (based solely on the curation data 325) only if at least a threshold number of users have indicated they do not trust the skill.

The system may assume that, for a "bad acting" skill, users will provide minimal user inputs that invoke the bad acting skill. Thus, a population base of users invoking the bad acting skill may be minimal. As such, with respect to the skill usage data 335, the skill categorization component 340 may determine a number of different users (e.g., a number of different user profile identifiers) associated with a same skill identifier over a period of time (e.g., 1 week, 2 weeks, 1 month, etc.), and may determine whether that number of different users satisfies a condition (e.g., a threshold number of different users or user profile identifiers). If the number of different users satisfies the condition, the skill categorization component 340 may increase the skill's category. Conversely, if the number of different users fails to satisfy the condition, the skill categorization component 340 may decrease the skill's category. For further example, the skill categorization component 340 may determine a number of different devices (e.g., a number of different device identifiers) associated with a same skill identifier over a period of time (e.g., 1 week, 2 weeks, 1 month, etc.), and may determine whether the number of different devices satisfies a condition (e.g., a threshold number of different devices or device identifiers). If the number of different devices satisfies the condition, the skill categorization component 340 may increase the skill's category. Conversely, if the number of different devices fails to satisfy the condition, the skill categorization component 340 may decrease the skill's category. In view of the foregoing, it will be appreciated that a trusted skill may become untrusted based on users no longer providing inputs that cause the skill to be invoked.

As described, certain devices 110 may communicate directly with the server(s) 120 and other devices 110 may communicate with the server(s) 120 via companion applications implemented by the devices 110. In certain implementations, the foregoing device identifier processing performed by the skill categorization component 340 may be limited to only device identifiers associated with devices 110 that communicate directly with the server(s) 120.

As described, the skill categorization component 340 may process with respect to device identifiers. In at least some instances, the skill categorization component 340 may process with respect to Internet Protocol (IP) addresses represented in the skill usage data 335. For example, the skill categorization component 340 may determine a number of different IP addresses associated with a same skill identifier over a period of time (e.g., 1 week, 2 weeks, 1 month, etc.), and may determine whether the number of different IP addresses satisfies a condition (e.g., a threshold number of different IP addresses). If the number of different IP addresses satisfies the condition, the skill categorization component 340 may increase the skill's category. Conversely, if the number of different IP addresses fails to satisfy the condition, the skill categorzation component 340 may decrease the skill's category.

The skill categorization component 340 may also or alternatively process with respect to geographic locations represented in the skill usage data 335. For example, the skill categorization component 340 may determine a number of different geographic locations associated with a same skill identifier over a period of time (e.g., 1 week, 2 weeks, 1 month, etc.), and may determine whether the number of different geographic locations satisfies a condition (e.g., a threshold number of different geographic locations). If the number of different geographic locations satisfies the condition, the skill categorization component 340 may increase the skill's category. Conversely, if the number of different geographic locations fails to satisfy the condition, the skill categorization component 340 may decrease the skill's category. A geographic location may refer to a global position coordinate, a postal address, a city, a county, a state, or some other geographic position.

The skill categorization component 340 may also or alternatively process with respect to group profile identifiers represented in the skill usage data 335. For example, the skill categorization component 340 may determine a number of different group profile identifiers associated with a same skill identifier over a period of time (e.g., 1 week, 2 weeks, 1 month, etc.), and may determine whether the number of different group profile identifiers satisfies a condition (e.g., a threshold number of different geographic locations). If the number of different group profile identifiers satisfies the condition, the skill categorization component 340 may increase the skill's category. Conversely, if the number of different group profile identifiers fails to satisfy the condition, the skill categorization component 340 may decrease the skill's category.

The skill categorization component 340 may also consider package size in categorizing a skill. A skill developer may provide a file(s) that the system uses to define the skill. The file may include, for example, a title, description, keywords, sample utterances for invoking the skill, etc. If the file size changes, such change may be an indication that the skills is materially different.

The skill categorization component 340 may also consider an invocation name of a skill. For example, a new skill having a similar invocation name (e.g., phonetically similar) to an established skill may indicate the new skill is trying to "squat" on user inputs intended to invoke the established skill. In such instances, the skill categorization component 340 may decrease the category of the new skill.

The skill categorization component 340 may implement one or more trained machine learning models. A machine learning model may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, boosting combined with decision trees, and random forests. Focusing on SVM as an example, SVM is a supervised learning model with associated learning algorithms that analyze data and recognize patterns in the data, and which are commonly used for classification. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. The SVM may try to create are large of gaps (e.g., margins) as possible. New examples are then mapped into that same space and predicted to belong to a category based on which side of hyperplanes they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, stochastic learning, or other known techniques. Components of the present disclosure may implement different types of machine learning models, including statistical learning models, supervised learning models, semi-supervised learning models, gradient decent models, and maximum likelihood models.

The skill categorization component 340 may persist skill categories (represented as skill category data 355) in skill category storage 350. The skill categorization component 340 may perform skill categorization operations on a periodic basis to ensure the skill category data, persisted in the skill category storage 350, is up-to-date.

As described, the skill categorization component 340 may decrease a skill's category in response to various information. The skill categorization component 340 may simply decrease a skill's category to a minimum category. If a skill's category corresponds to the minimum category, the skill categorization component 340 may be configured to not disable the skill with respect to one or more users of the system as disabling a skill is a rather destructive process. For example, disabling a gaming skill identifier with respect to a user profile identifier may result in accumulated gaming data for the user being lost since later enablement of the gaming skill identifier with the same user profile identifier may not result in the accumulated gaming data being reattributed to the user. Even though the skill is not disabled, associating the skill with the minimum category may result in minimal to no discoverability of the skill (e.g., decrease or negate the possibility of the skill being invoked in response to a user input). Thus, associating a skill with a minimum category may have the same discoverability effects on a skill as disabling the skill, while enabling accumulated data to be maintained for if/when the skill is no longer untrusted or blacklisted.

A skill may be untrusted or blacklisted temporarily. For example, after a skill becomes untrusted or blacklisted, a human curator of the system may analyze the data (used by the skill categorization component 340 to determine the skill should be untrusted or blacklisted) to determine if the skill's category is appropriate. If the user curator determines the category is inappropriate, the user curator may manually re-categorize the skill, which may result in the skill becoming trusted (and by extension invocable to a greater degree). For further example, after a skill becomes untrusted or blacklisted, the skill categorization component 340 may process further data (e.g., further skill event data 315, curation data 325, and/or skill usage data 335) and therefrom determine the skill's category should be increased to no longer being untrusted or blacklisted.

Figure 4:
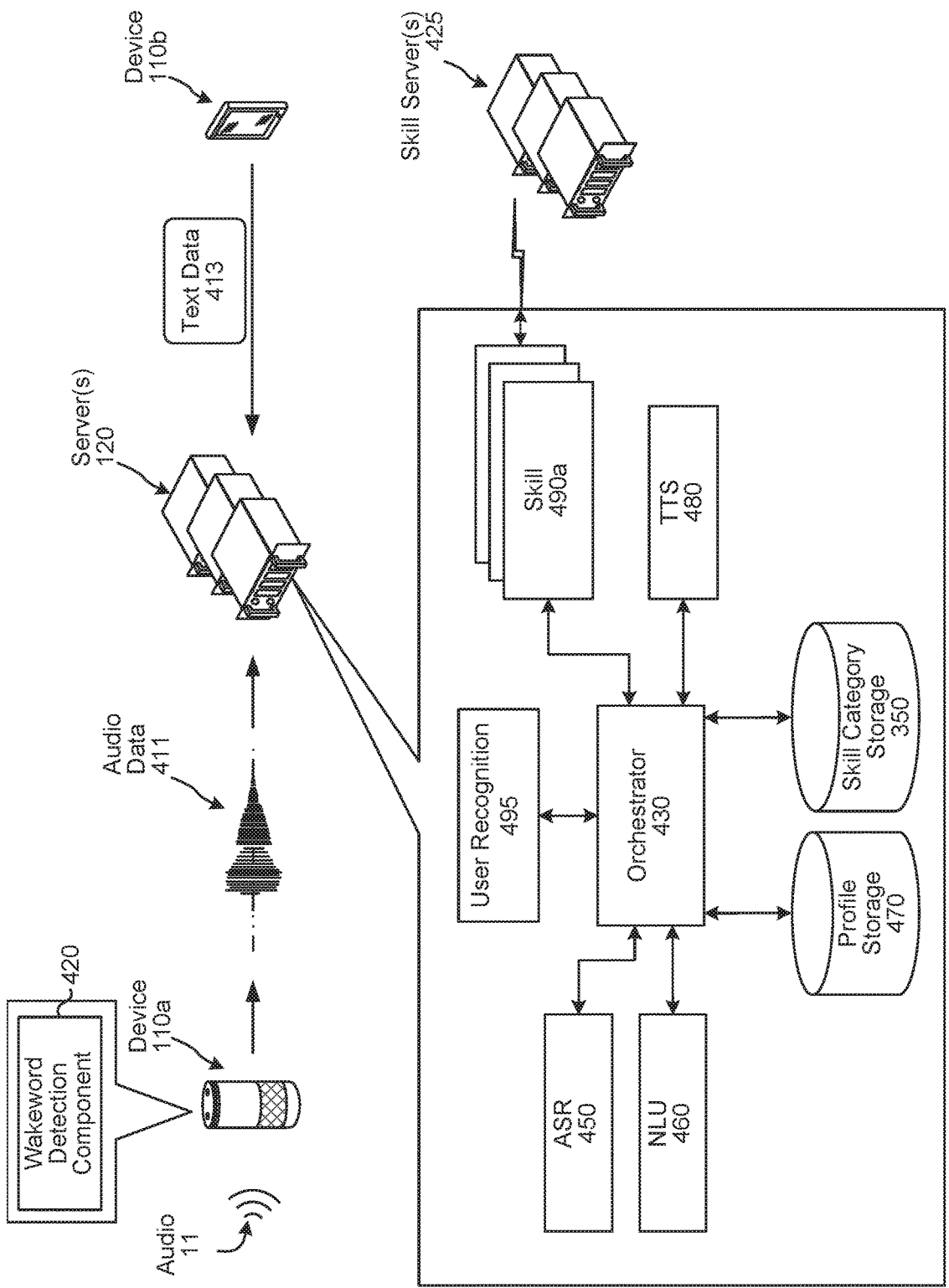
FIG. 4 is a conceptual diagram of components of a system according to embodiments of the present disclosure.

The system may operate using various components at runtime, as illustrated in FIG. 4. The various components may be located on same or different physical devices. Communication between various components may occur directly or across a network(s) 199.

An audio capture component(s), such as a microphone or array of microphones of the device 110*a*, may capture audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 420 to perform wakeword detection (e.g., to determine whether a user intended to speak an input to the device 110*a*). An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 420 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recurrent neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 411, representing the audio 11, to the server(s) 120. The audio data 411 may include data corresponding to the wakeword, or the portion of the audio data 411 corresponding to the wakeword may be removed by the device 110 prior to sending the audio data 411 to the server(s) 120.

Upon receipt by the server(s) 120, the audio data 411 may be sent to an orchestrator component 430. The orchestrator component 230 may include memory and logic that enables the orchestrator component 430 to transmit various pieces and forms of data to various components of the system, as well as perform other operations.

The orchestrator component 430 sends the audio data 411 to an ASR component 450. The ASR component 450 transcribes the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the speech represented in the audio data 411. The ASR component 450 sends the text data generated thereby to an NLU component 460, for example via the orchestrator component 430. The text data output by the ASR component 450 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

In some instances, a user may provide a text-based user input to the device 110b. In such instances, the device 110b may generate text data 413, representing the text-based user input, and may send the text data 413 to the server(s) 120, for example via a companion application implemented by the device 110b. Upon receipt by the server(s) 120, the orchestrator component 430 (or another component of the server(s) 120) may send the text data 413 to the NLU component 460.

The NLU component 460 attempts to make a semantic interpretation of the phrase(s) or statement(s) represented in the text data (e.g., as generated by the ASR component 450 or as received from the device 110b) input therein. That is, the NLU component 460 determines one or more meanings associated with the phrase(s) or statement(s) represented in the text data based on words represented in the text data. The NLU component 460 determines an intent representing an action that a user desires be performed as well as pieces of the text data that allow a device (e.g., the device 110a, the device 110b, the server(s) 120, a skill component 490, a skill server(s) 425, etc.) to execute the intent. For example, if the text data corresponds to "play Adele music," the NLU component 460 may determine an intent that the system output music and may identify "Adele" as an artist. For further example, if the text data corresponds to "what is the weather," the NLU component 460 may determine an intent that the system output weather information associated with a geographic location of the device (110a/110b). In another example, if the text data corresponds to "turn off the lights," the NLU component 460 may determine an intent that the system turn off lights associated with the device (110a/110b) and/or the user 5.

The NLU component 460 may send NLU results data (which may include tagged text data, indicators of intent, etc.) to the orchestrator component 430. The orchestrator component 430 may send the NLU results data to a skill component(s) 490. If the NLU results data includes a single NLU hypothesis, the orchestrator component 430 may send the NLU results data to the skill component(s) 490 associated with the NLU hypothesis. If the NLU results data includes an N-best list of NLU hypotheses, the orchestrator component 4300 may send the top scoring NLU hypothesis to a skill component(s) 490 associated with the top scoring NLU hypothesis.

A "skill component" may be software running on the server(s) 120 that is akin to a software application running on a traditional computing device. That is, a skill component 490 may enable the server(s) 120 to execute specific functionality in order to provide data or produce some other requested output. The server(s) 120 may be configured with more than one skill component 490. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 490 may operate in conjunction between the server(s) 120 and other devices, such as the device (110a/110b), in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

In addition or alternatively to being implemented by the server(s) 120, a skill component 490 may be implemented by a skill server(s) 425. Such may enable a skill server(s) 425 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a skill component 490 dedicated to interacting with the skill server(s) 425.

Unless expressly stated otherwise, reference to a skill, skill device, or skill component may include a skill component 490 operated by the server(s) 120 and/or skill operated by the skill server(s) 425. Moreover, the functionality described herein as a skill may be referred to using many different terms, such as an action, bot, app, or the like.

Certain systems may be configured to limit some or all of the processing described herein to skill implemented at least in part by a skill server(s) 425. In other words, certain systems may not perform at least some of the herein disclosed processing with respect to skills that are wholly implemented by the server(s) 120.

The server(s) 120 may include a TTS component 480 that generates audio data (e.g., synthesized speech) from text data using one or more different methods. Text data input to the TTS component 480 may come from a skill component 490, the orchestrator component 430, or another component of the system.

In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder. Synthesized speech generated by the TTS component 480 may be output to the user 5 in response to a user input.

The server(s) 120 may include profile storage 470. The profile storage 470 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier. Each user profile may include various user identifying information. Each user profile may also include preferences of the user; one or more device identifiers, representing one or more devices of the user; information representing skills that have been enabled for or by the user; as well as other information.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user recognition component 495 that recognizes one or more users associated with data input to the system. The user recognition component 495 may take as input the audio data 411. The user recognition component 495 may perform user recognition by comparing audio characteristics in the audio data 411 to stored audio characteristics of users. The user recognition component 495 may also or alternatively perform user recognition by comparing biometric data (e.g., fingerprint data, iris data, etc.), received by the system in correlation with the present user input, to stored biometric data of users. The user recognition component 495 may also or alternatively perform user recognition by comparing image data (e.g., including a representation of at least a feature of a user), received by the system in correlation with the present user input, with stored image data including representations of features of different users. The user recognition component 495 may perform additional user recognition processes, including those known in the art.

The user recognition component 495 determines scores indicating whether user input originated from a particular user. For example, a first score may indicate a likelihood that the user input originated from a first user, a second score may indicate a likelihood that the user input originated from a second user, etc. The user recognition component 495 may also determine an overall confidence regarding the accuracy of user recognition operations.

The user recognition component 495 may output a single user identifier corresponding to the most likely user that originated the user input. Alternatively, the user recognition component 495 may output an N-best list of user identifiers with respective scores indicating likelihoods of respective users originating the user input. The output of the user recognition component 495 may be used to inform NLU processing, processing performed by a skill component 490, as well as processing performed by other components of the system.

One or more components of the server(s) 120 illustrated in FIG. 4 may communicate one or more components of the server(s) 120 illustrated in FIG. 3.

Figure 5:
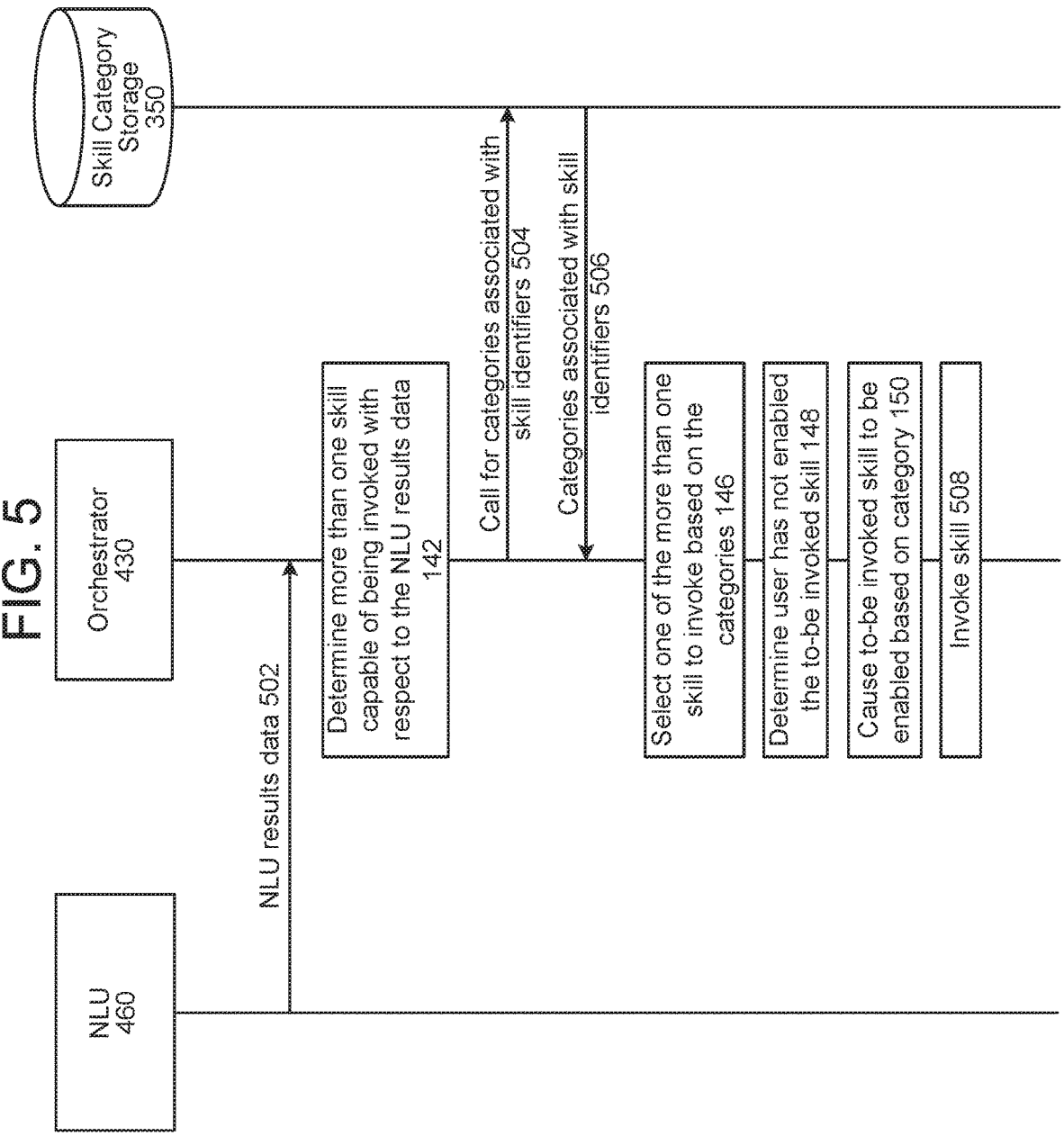
FIG. 5 is a signal flow diagram illustrating the selection of an enablement process for a skill based on offline categorization according to embodiments of the present disclosure.

As described above, at runtime, the NLU component 460 may output NLU results data. As illustrated in FIG. 5, the orchestrator component 430 may receive (502) the NLU results data and determine (142) more than one skill capable of being invoked with respect to the NLU results data. For example, the NLU results data may include an intent indicator corresponding to <OutputContent> and a slot corresponding to "Content Type" populated with "Cat Facts." Based on the intent indicator and the populated slot, the orchestrator component 430 may identify various cat fact skills.

The orchestrator component 430 calls (504) the skill category storage 350 for categories associated with skill identifiers representing the determined skills. Thereafter, the orchestrator component 430 receives (506) the requested categories from the skill category storage 350.

The orchestrator component 430 selects (146) a skill, of the determined more than one skill at step 142, to be invoked based on the categories. When the orchestrator component 430 determines more than one skill at step 142, the orchestrator component 430 may generate a respective confidence value for each determined skill. The confidence value associated with a skill represents the orchestrator component 430's confidence that the skill should be invoked based on the NLU results data. If the two (or more) highest confidence values of the skills are within a threshold deviation of each other, the orchestrator component 430 may select the skill with the highest category to be invoked.

The orchestrator component 430 may thereafter determine (148) the selected skill has not been enabled by the user. For example, the orchestrator component 430 may determine a user profile identifier associated with the user, may determine user profile data associated with the user profile identifier, and may determine the user profile data does not represent the skill has been enabled by the user.

In selecting the skill at step 146, the orchestrator component 430 may consider the type of user input that was received. As illustrated in FIG. 2, a skill's category may affect the skill's discoverability with respect to different types of user interfaces. Thus, for example, if a determined skill at step 142 corresponds to a category of 1 or lower (as illustrated in FIG. 2), and the user input was received as speech, the orchestrator component 430 may not select the skill at step 148. For further example, if a determined skill at step 142 corresponds to a category of 0 (as illustrated in FIG. 2), the orchestrator component 430 may not select the skill at step 148, regardless of the type of user input that was received (since the skill's category prevents discoverability using either a GUI or a VUI).

The orchestrator component 430 may thereafter cause (150) the to-be invoked skill to be enabled based on the skill's category. For example, if the to-be invoked skill corresponds to a category of 1 (as illustrated in FIG. 2) and the user input was received as speech via a VUI, the orchestrator component 430 may cause synthesized speech (e.g., generated by the TTS component 480) to be output by a device 110, with the synthesized speech requesting the user 5 to enable the skill using a GUI of device (e.g., a GUI presented by a companion application implemented by a device). Based on outputting the synthesized speech, the orchestrator component 430 may cause information corresponding to the to-be invoked skill to be presented on a home page of the GUI (e.g., the companion application may display a push notification or other graphical element representing the skill and, upon the user selecting the graphical element, the companion application may display detailed information of the skill). In response to receiving a further user input, via the VUI, that the skill is to be enabled, the orchestrator component 430 may cause the user profile data (associated with the user's user profile identifier) to represent the to-be invoked skill as enabled. For further example, if the to-be invoked skill corresponds to a category of 4 (as illustrated in FIG. 2) and the user input was received as speech via a VUI, the orchestrator component 430 may cause synthesized speech (e.g., generated by the TTS component 480) to be output by a device 110, with the synthesized speech requesting the user 5 provide a further spoken user input representing the to-be invoked skill is to be enabled. In response to receiving a further spoken user input that the skill is to be enabled, the orchestrator component 430 may cause the user profile data (associated with the user's user profile identifier) to represent the to-be invoked skill as enabled. In another example, if the to-be invoked skill corresponds to a category of 5 (as illustrated in FIG. 2) and the user input was received as speech via a VUI, the orchestrator component 430 may cause the user profile data (associated with the user's user profile identifier) to represent the to-be invoked skill as enabled, without receiving a further user input. Nonetheless, in response to enabling the to-be invoked skill with respect to the user profile data and without further user input, the orchestrator component 430 may cause synthesized speech (e.g., generated by the TTS component 480) to be output by a device 110, with the synthesized speech representing the to-be invoked skill was enabled for the user 5. The foregoing enablement processes are illustrative. As such, one skilled in the art will appreciate that other enablement processes are encompassed by the present disclosure.

After the skill is enabled, the orchestrator component 430 may invoke (508) the skill. Invocation of the skill may include the orchestrator component 430 sending the NLU results data (or a portion thereof) to the skill.

Figure 6:
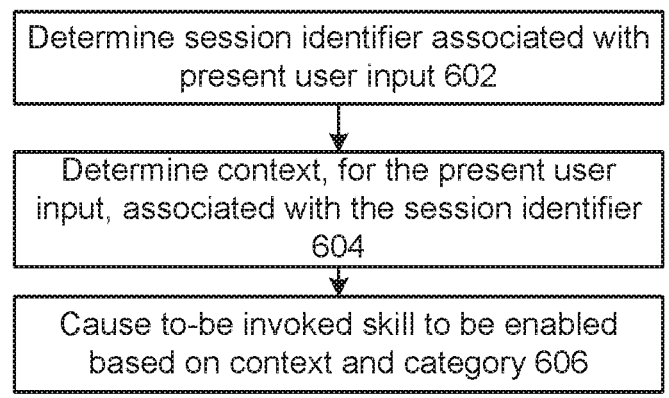
FIG. 6 is a process flow diagram illustrating the selection of an enablement process for a skill based on a present dialog context and offline categorization according to embodiments of the present disclosure.

As described above, the system may cause a skill to be enabled based on offline-generated categories. As illustrated in FIG. 6, the system may cause a skill to be enabled based on a present dialog context in addition to offline-generated categories. A dialog may correspond to various user inputs and system outputs. When the server(s) 120 receives a user input, the server(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes the skill, the system may send the session identifier to the skill in addition to NLU results data. If the skills outputs data from presentment to the user, the skill may associate the data with the session identifier. The foregoing is illustrative and, thus, one skilled in the art will appreciate that a session identifier may be used to track data transmitted between various components of the system. A session identifier may be closed (e.g., a dialog between a user and the system may end) after a skill performs a requested action (e.g., after the skill causes content to be output to the user).

The orchestrator component 430 may determine (602) a session identifier associated with the present user input. The orchestrator component 430 may use the session identifier to determine (604) a context for the present user input. The context may correspond to various information.

The context may indicate a category of skill to be invoked was inferred from the present user input (e.g., the skill category is unrepresented from a list of predetermined skill categories). For example, a user input may correspond to "Alexa, what are your snowboarding skills." The system may not be configured with a "snowboarding" category of skills and, thus, the NLU component 460 may infer the user input relates to a "sports" (or the like) category of skills. Data representing this inference may be associated with the session identifier of the present user input.

The context may also indicate whether everything the user is requesting is available from a particular skill. The context may also indicate whether the user input explicitly indicated a skill should be enabled. One skilled in the art will appreciate that the context may include other or additional information not delineated above.

The orchestrator component 430 may cause (606) the to-be invoked skill to be enabled based on the context and the to-be invoked skill's category. For example, the system may perform enablement using a first set of user experiences if the skill category is inferred from the user input, but may use a second, different set of user experiences if the skill category of the user input correlates to a preconfigured skill category.

Figure 7:
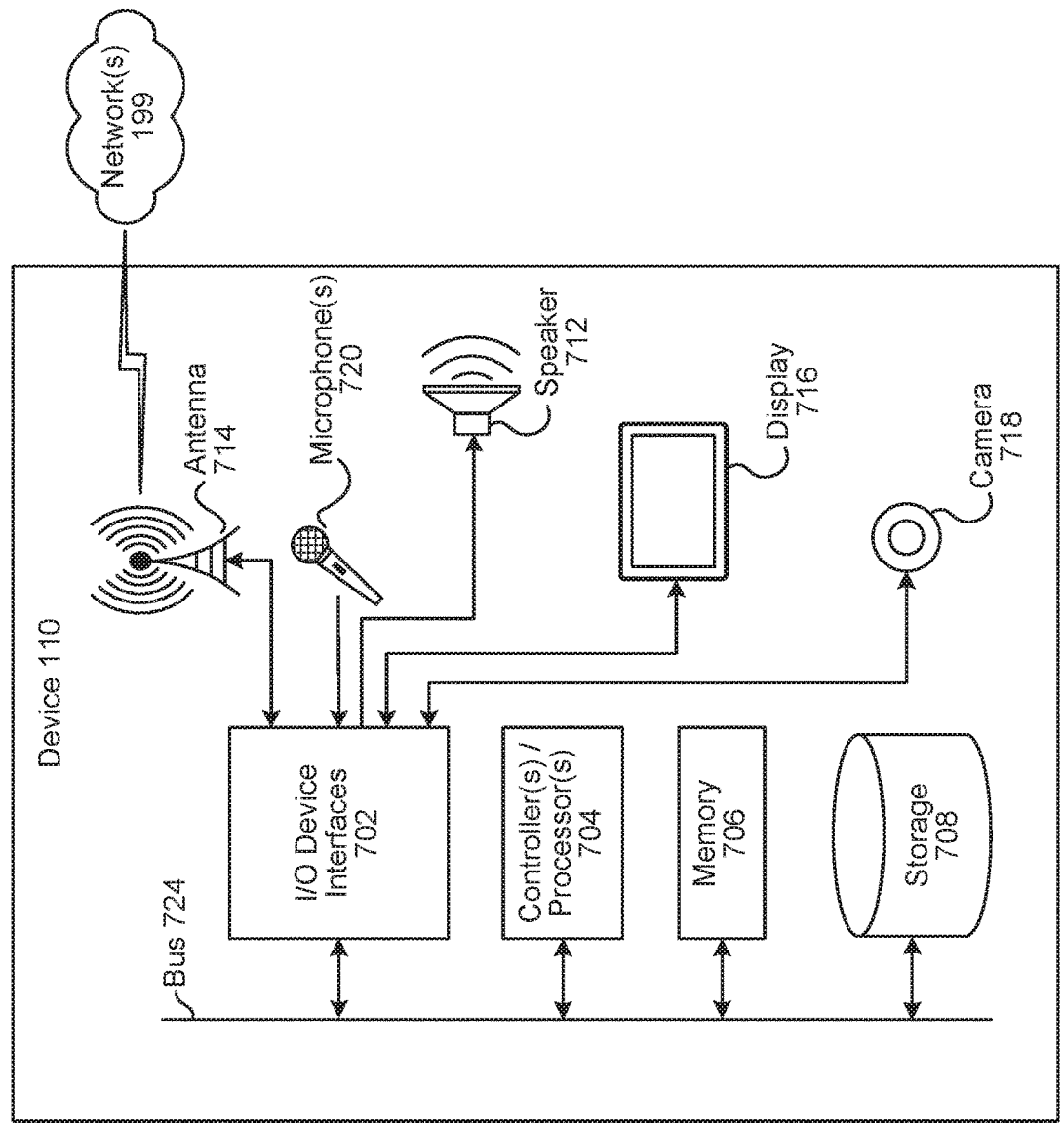
FIG. 7 is a block diagram conceptually illustrating example components of a device according to embodiments of the present disclosure.
Figure 8:
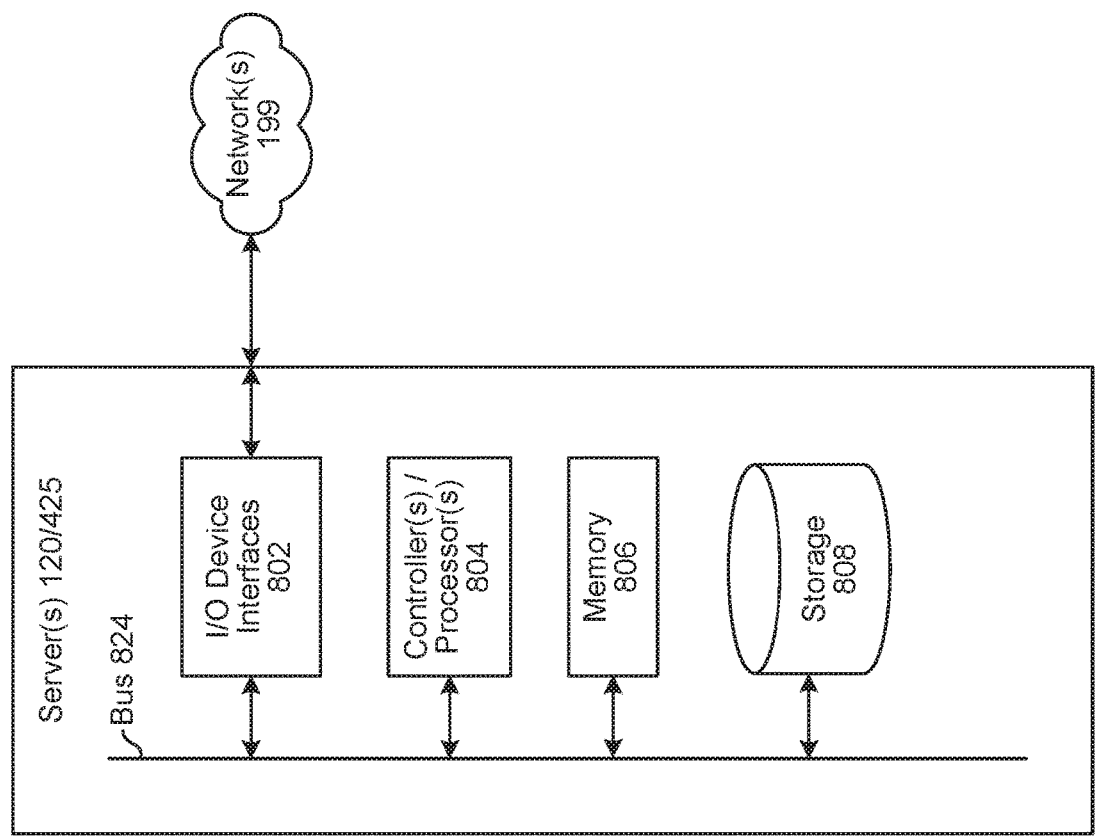
FIG. 8 is a block diagram conceptually illustrating example components of a server according to embodiments of the present disclosure.

FIG. 7 is a block diagram conceptually illustrating a device 110 that may be used with the system. FIG. 8 is a block diagram conceptually illustrating example components of a remote device, such as the server(s) 120, which may assist with ASR processing, NLU processing, etc., and the skill server(s) 425. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/425) may be included in the system, such as one or more servers 120 for performing ASR processing, one or more servers 120 for performing NLU processing, one or more skill server(s) 425 for performing actions responsive to user inputs, etc. In operation, each of these devices (or groups of devices) may include computer-readable and computer-executable instructions that reside on the respective device (120/425), as will be discussed further below.

Each of these devices (110/120/425) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/425) may also include a data storage component (708/808) for storing data and controller/processor-executable instructions. Each data storage component (708/808) may individually include one or more non-volatile storage types such as magnetic storage, optical storage, solid-state storage, etc. Each device (110/120/425) may also be connected to removable or external non-volatile memory and/or storage (such as a removable memory card, memory key drive, networked storage, etc.) through respective input/output device interfaces (702/802).

Computer instructions for operating each device (110/120/45) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/425) includes input/output device interfaces (702/802). A variety of components may be connected through the input/output device interfaces (702/802), as will be discussed further below. Additionally, each device (110/120/425) may include an address/data bus (724/824) for conveying data among components of the respective device. Each component within a device (110/120/425) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the server(s) 120, or the skill server(s) 425 may include their own dedicated processors, memory, and/or storage. Alternatively, one or more of the components of the device(s) 110, the server(s) 120, or the skill server(s) 225 may utilize the I/O interfaces (702/802), processor(s) (704/804), memory (706/806), and/or storage (708/808) of the device(s) 110 server(s) 120, or the skill server(s) 425, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 425, as described herein, are illustrative, and may be located as a stand-alone device or may be included, in whole or in part, as a component of a larger device or system.

As illustrated in FIG. 9, multiple devices (110a-110g, 120, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 425, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, audio data representing a user input;
performing automatic speech recognition (ASR) processing on the audio data to generate text data;
performing natural language understanding (NLU) processing on the text data to generate NLU results data;
determining a first skill is configured to execute with respect to the NLU results data;
determining a second skill is configured to execute with respect to the NLU results data;
determining the first skill corresponds to a first category, the first category representing a number of user identifiers, which have caused the first skill to be invoked within a past period of time;
determining the first category satisfies a first condition;
determining the second skill corresponds to a second category;
selecting the first skill based at least in part on comparing the first category and the second category;
determining user profile data associated with the audio data;
determining the first skill is missing from a list of enabled skills represented in the user profile data;
determining the first category satisfies a second condition;
based at least in part on the first category satisfying the second condition, storing first data indicating the first skill is enabled with respect to the user profile data; and
sending at least a portion of the NLU results data to a second device associated with the first skill.

2. The method of claim 1, further comprising:
receiving, from the first device, second audio data representing a second user input;
performing speech processing on the second audio data to generate second NLU results data;
determining a third skill is configured to execute with respect to the second NLU results data;
determining the third skill corresponds to a third category;

determining the third category fails to satisfy a threshold category;
based at least in part on the third category failing to satisfy the threshold category, causing the first device to output audio requesting a user indicate the third skill is to be executable with respect to user inputs associated with the user profile data;
receiving, from the first device, third audio data representing the third skill is to be executable with respect to user inputs associated with the user profile data; and
storing, with respect to the user profile data, second data indicating the third skill is executable with respect to user inputs.

3. The method of claim 1, further comprising:
determining the number of user identifiers that have caused the first skill to be invoked within the past period of time;
determining the number of user identifiers satisfies a threshold number of user identifiers; and
determining the first category based at least in part on the number of user identifiers satisfying the threshold number of user identifiers.

4. The method of claim 1, further comprising:
determining, from the NLU results data, a skill category corresponding to a plurality of skills configured to respond to the user input;
determining the skill category is unrepresented in a list of predetermined skill categories;
generating second data representing the skill category is unrepresented in a list of predetermined skill categories;
associating the first data with a session identifier associated with the audio data;
after selecting the first skill, identifying the second data using the session identifier; and
storing the first data further based at least in part on the second data.

5. A method, comprising:
receiving, from a device, first data representing a user input;
generating natural language understanding (NLU) results data representing the first data;
determining a skill configured to execute with respect to the NLU results data;
determining the skill corresponds to a category, the category representing a trustworthiness of the skill, the category to be used to determine how the skill is to be enabled with respect to a user profile;
determining user profile data associated with the first data;
determining the skill is missing from a list of enabled skills represented in the user profile data; and
determining an enablement process for the skill based at least in part on the category.

6. The method of claim 5, further comprising:
determining the category satisfies a condition; and
based at least in part on the category satisfying the condition, storing second data indicating the skill is enabled with respect to the user profile data.

7. The method of claim 5, further comprising:
determining the category fails to satisfy a condition;
based at least in part on the category failing to satisfying the condition, causing the device to output audio requesting a user indicate the skill is to be enabled;
receiving, from the device, audio data representing the skill is to be enabled; and
after receiving the audio data, storing second data indicating the skill is enabled with respect to the user profile data.

8. The method of claim 5, further comprising:
determining the category fails to satisfy a condition;
based at least in part on the category failing to satisfying the condition, causing the device to display content requesting a user indicate the skill is to be enabled;
receiving, from the device, an indicator representing the skill is to be enabled; and
after receiving the indicator, storing second data indicating the skill is enabled with respect to the user profile data.

9. The method of claim 5, further comprising:
determining a skill category based at least in part the first data, the skill category representing a type of skill to be invoked to respond to the first data;
associating the skill category with a session identifier associated with the first data;
after selecting the skill, identifying the skill category using the session identifier; and
determining the enablement process further based at least in part on the skill category being inferred from the first data.

10. The method of claim 5, further comprising:
determining a number of users that have caused the skill to be invoked within a past period of time;
determining the number of users satisfies a condition; and
storing an association between the skill and the category based at least in part on the number of users satisfying the condition.

11. The method of claim 5, further comprising:
determining a number of devices that have captured user inputs that caused the skill to be invoked within a past period of time;
determining the number of devices satisfies a condition; and
storing an association between the skill and the category based at least in part on the number of devices satisfying the condition.

12. The method of claim 5, further comprising:
receiving, from the skill, second data representing an action of the skill, the action being performed in response to a second user input, the second user input being received prior to the user input; and
storing an association between the skill and the category based at least in part on the second data.

13. The method of claim 5, further comprising:
receiving a skill to be implemented by a system;
receiving a first source identifier associated with the skill;
determining the first source identifier is represented in a list of source identifiers associated with skills corresponding to at least a threshold category; and
storing an association between the skill and the at least a threshold category based at least in part on the first source identifier being represented in the list.

14. A system, comprising:
at least one processor; and
at least one memory comprising instructions that, when executed by the at least one processor, cause the system to:
receive, from a device, first data representing a user input;
generate natural language understanding (NLU) results data representing the first data;
determine a skill configured to execute with respect to the NLU results data;

determine the skill corresponds to a category, the category representing a trustworthiness of the skill, the category to be used to determine how the skill is to be enabled with respect to a user profile;
determine user profile data associated with the first data;
determine the skill is missing from a list of enabled skills represented in the user profile data; and
determine an enablement process for the skill based at least in part on the category.

15. The system of claim 14, wherein the at least one memory further comprises instructions that, when executed by the at least one processor, further cause the system to:
   determine the category satisfies a condition; and
   based at least in part on the category satisfying the condition, store second data indicating the skill is enabled with respect to the user profile data.

16. The system of claim 14, wherein the at least one memory further comprises instructions that, when executed by the at least one processor, further cause the system to:
   determine the category fails to satisfy a condition;
   based at least in part on the category failing to satisfying the condition, cause the device to output audio requesting a user indicate the skill is to be enabled;
   receive, from the device, audio data representing the skill is to be enabled; and
   after receiving the audio data, store second data indicating the skill is enabled with respect to the user profile data.

17. The system of claim 14, wherein the at least one memory further comprises instructions that, when executed by the at least one processor, further cause the system to:
   determine the category fails to satisfy a condition;
   based at least in part on the category failing to satisfying the condition, cause the device to display content requesting a user indicate the skill is to be enabled;
   receive, from the device, an indicator representing the skill is to be enabled; and
   after receiving the indicator, store second data indicating the skill is enabled with respect to the user profile data.

18. The system of claim 14, wherein the at least one memory further comprises instructions that, when executed by the at least one processor, further cause the system to:
   determine a skill category based at least in part the first data, the skill category representing a type of skill to be invoked to respond to the first data;
   associate the skill category with a session identifier associated with the first data;
   after selecting the skill, identify the skill category using the session identifier; and
   determine the enablement process further based at least in part on the skill category being inferred from the first data.

19. The system of claim 14, wherein the at least one memory further comprises instructions that, when executed by the at least one processor, further cause the system to:
   determine a number of users that have caused the skill to be invoked within a past period of time;
   determine the number of users satisfies a condition; and
   storing an association between the skill and the category based at least in part on the number of users satisfying the condition.

20. The system of claim 14, wherein the at least one memory further comprises instructions that, when executed by the at least one processor, further cause the system to:
   determine a number of devices that have captured user inputs that caused the skill to be invoked within a past period of time;
   determine the number of devices satisfies a condition; and
   storing an association between the skill and the category based at least in part on the number of devices satisfying the condition.

* * * * *